(No Model.)
R. C. SNEDEKER.
ROD PACKING.
No. 431,532. Patented July 1, 1890.
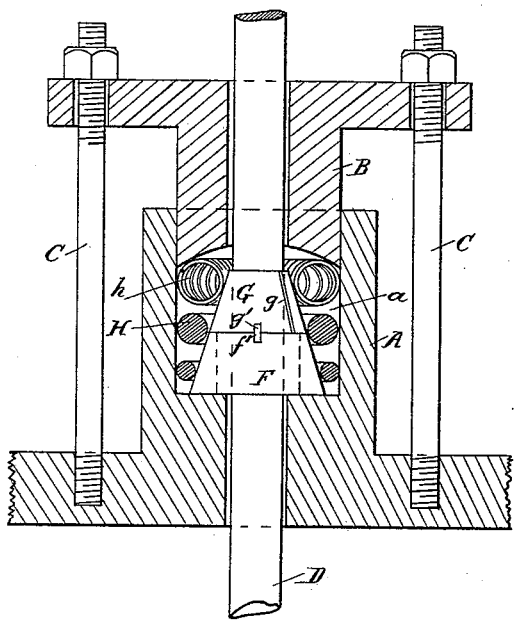
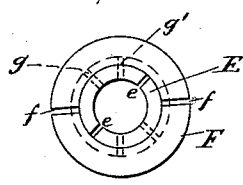
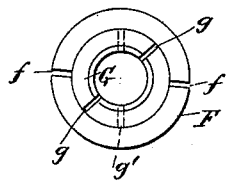
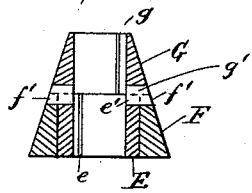
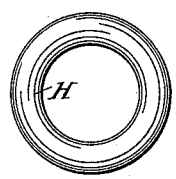
WITNESSES
INVENTOR
R. C. Snedeker
by Herbert W. T. Jenner,
Attorney

UNITED STATES PATENT OFFICE.

RALPH C. SNEDEKER, OF TERRE HAUTE, INDIANA, ASSIGNOR OF ONE-HALF TO GEORGE W. MURPHY, OF SAME PLACE.

ROD-PACKING.

SPECIFICATION forming part of Letters Patent No. 431,532, dated July 1, 1890.

Application filed December 30, 1889. Serial No. 335,418. (No model.)

*To all whom it may concern:*

Be it known that I, RALPH C. SNEDEKER, a citizen of the United States, residing at Terre Haute, in the county of Vigo and State of Indiana, have invented certain new and useful Improvements in Stuffing-Box Packing; and I do hereby declare the following to be a full, clear, and exact description of the invention, such as will enable others skilled in the art to which it appertains to make and use the same.

This invention relates to the packing used in stuffing-boxes; and it consists in the novel construction and combination of the parts hereinafter fully described and claimed.

In the drawings, Figure 1 is a longitudinal section through a stuffing-box provided with packing according to this invention. Fig. 2 is a plan view of the packing from below. Fig. 3 is a longitudinal section through the packing. Fig. 4 is a plan view of the packing from above. Fig. 5 is a plan view of one of the spring-rings.

A is an ordinary stuffing-box provided with a packing-chamber $a$. B is a gland or follower, and C are screw-threaded bolts provided with nuts for pressing the gland into the packing-chamber. All of these parts may be of any ordinary approved construction.

D is the rod which passes through the stuffing-box and is kept tight by the packing.

E is a short cylinder bored to fit the rod and divided into two equal half-cylinders by the openings $e$. $e'$ are notches in the top of said cylinder.

F is a large cone divided into two equal half-cones by the openings $f$. This cone is of the same height as the cylinder E, and the inside of the cone is bored cylindrical to fit the outside of the said cylinder. Notches $f'$ are provided in the top edge of cone F, similar to notches $e'$, and arranged in line with them. The openings $e$ and $f$ are arranged to break joint and be out of line with each other when the said notches are in line, so that no steam can pass between the cylinder and the cone which surrounds it.

G is a short cone placed on top of the cylinder and cone F. The cone G is bored cylindrical to fit the rod, and its conical surface forms a continuation of the conical surface of the lower cone. The cone G is divided into two equal half-cones by the openings $g$. Stops $g'$ project from the bottom of the said cone G, and fit into the notches $e'$ and $f'$ in the cylinder and lower cone, thereby preventing all the said parts from having any circumferential motion with regard to each other, but permitting them to be pressed closer to the rod as they become worn. The stops $g'$ may be formed integral with the cone G; but they are preferably formed of separate pieces of metal driven tightly into slots formed in the base of said cone, so that their lower parts project therefrom. The openings $g$ are arranged to break joint and be out of line with the openings $e$ and $f$, and the said openings $e$ and $f$ are covered by the base of the cone G, so that no steam can pass through them in line with the rod.

H are spring-rings which surround the cones and are adapted to be compressed by the gland, so that the metallic packing is pressed against the rod with sufficient force to keep it steam-tight. The cones and cylinder may be formed of any metal; but Babbitt metal is preferred, or brass and metalline may be used as an equivalent and adapted to serve the same purpose.

The rings H may be of any elastic or semi-elastic material—such as india-rubber—or spring-rings of coiled wire, as shown at $h$, may be used; or, if desired, both coiled-wire rings and india-rubber rings may be used in the same stuffing-box.

What I claim is—

1. The combination, with a stuffing-box, of the divided cylinder E, resting on the bottom of said box, the divided lower cone surrounding said cylinder, the divided upper cone resting on the tops of said lower cone and cylinder, the radially-arranged stops $g'$, retaining said cones and cylinder in their relative positions, the spring-rings surrounding the cones, and the gland adapted to press the rings against the cones, substantially as and for the purpose set forth.

2. The combination, with a stuffing-box and its gland, of the packing consisting of the short cylinder provided with notches $e'$, the lower cone of equal height with and surrounding said cylinder and provided with notches $f'$ in line with said notches $e'$, and the upper cone covering the joint between the lower cone and internal cylinder and provided with stops on its base engaging with said notches, and each cone and the cylinder being divided into two by openings placed out of line with each other, and the spring-rings encircling the cones and adapted to be pressed against them by the gland, substantially as set forth.

In testimony whereof I affix my signature in presence of two witnesses.

RALPH C. SNEDEKER.

Witnesses:
GEORGE W. MURPHY,
JAMES C. BURDIN.